(12) United States Patent
Nakamura et al.

(10) Patent No.: US 11,519,817 B2
(45) Date of Patent: Dec. 6, 2022

(54) RAMAN GAIN EFFICIENCY DISTRIBUTION TESTING METHOD, AND RAMAN GAIN EFFICIENCY DISTRIBUTION TESTING DEVICE

(71) Applicant: NIPPON TELEGRAPH AND TELEPHONE CORPORATION, Tokyo (JP)

(72) Inventors: Atsushi Nakamura, Musashino (JP); Keiji Okamoto, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/268,113

(22) PCT Filed: Aug. 16, 2019

(86) PCT No.: PCT/JP2019/032103
§ 371 (c)(1),
(2) Date: Feb. 12, 2021

(87) PCT Pub. No.: WO2020/036218
PCT Pub. Date: Feb. 20, 2020

(65) Prior Publication Data
US 2022/0113220 A1    Apr. 14, 2022

(30) Foreign Application Priority Data
Aug. 16, 2018 (JP) .............................. JP2018-153035

(51) Int. Cl.
*G01M 11/00* (2006.01)

(52) U.S. Cl.
CPC ................................ *G01M 11/319* (2013.01)

(58) Field of Classification Search
CPC ................ B65H 61/005; B65H 63/065; B65H 2701/31; G01B 11/2433; G01B 11/105; G01B 11/16; G01N 21/8915; G01N 21/952; D01H 13/32; D01H 13/26; D02H 13/00; D04B 35/10; G01M 11/319; G01M 11/02
See application file for complete search history.

(56) References Cited

U.S. PATENT DOCUMENTS 10,753,824 B2 *   8/2020  Rapp .................... G01M 11/319
2004/0028359 A1 * 2/2004  Tirloni ............... G02B 6/29377
                                                                 385/123

(Continued)

FOREIGN PATENT DOCUMENTS

JP          2017203625 A       11/2017

OTHER PUBLICATIONS

M. Ohashi, et al., "Longitudinal filber parameter measurements of two-mode fiber links by using OTDR"; ECOC, 2014.

(Continued)

*Primary Examiner* — Sang H Nguyen

(57) ABSTRACT

An object of the present invention is to provide a Raman gain efficiency distribution testing method and a Raman gain efficiency distribution testing apparatus for measuring a Raman gain efficiency distribution of a fundamental mode and a first high-order mode in a few-mode fiber. The Raman gain efficiency distribution testing method and the Raman gain efficiency distribution testing apparatus according to the present invention compute a Raman gain coefficient of a tested optical fiber from a Raman gain coefficient of a pure quartz core optical fiber at an excitation wavelength of 1 μm, a wavelength of excitation light, and a relative refractive index difference between a core and a clad at an arbitrary position z, compute electric field distribution overlap integrals at an arbitrary position z, between modes, of a mode field diameter of each mode at a wavelength of signal light, and a mode field diameter of each mode at a wavelength of excitation light; and compute the product of the Raman gain (Continued)

coefficient and the electric field distribution overlap integrals, and acquire Raman gain efficiencies, between modes, of the signal light and the excitation light at the arbitrary position z.

6 Claims, 4 Drawing Sheets

(56) References Cited

U.S. PATENT DOCUMENTS

| | | | | |
|---|---|---|---|---|
| 2004/0071418 | A1* | 4/2004 | Seo | G02B 6/02 |
| | | | | 385/144 |
| 2005/0024711 | A1* | 2/2005 | Sugizaki | H04B 10/2916 |
| | | | | 359/334 |
| 2005/0225841 | A1* | 10/2005 | Bragheri | H01S 3/302 |
| | | | | 359/334 |
| 2006/0126162 | A1* | 6/2006 | Taniguchi | G02B 6/0281 |
| | | | | 359/334 |
| 2015/0364897 | A1* | 12/2015 | Wisk | H01S 3/302 |
| | | | | 359/334 |

OTHER PUBLICATIONS

Atsushi Nakamura, et al.; "Effective mode field diameter for LP11 mode and its measurement technique", IEEE Photon. Technol. Lett, vol. 28, No. 22, 2016, pp. 2553-2556.

* cited by examiner

RAMAN GAIN EFFICIENCY DISTRIBUTION TESTING METHOD, AND RAMAN GAIN EFFICIENCY DISTRIBUTION TESTING DEVICE

CROSS-REFERENCE TO RELATED APPLICATIONS

This application is a 371 U.S. National Phase of International Application No. PCT/JP2019/032103, filed on Aug. 16, 2019, which claims priority to Japanese Application No. 2018-153035 filed on Aug. 16, 2018. The entire disclosures of the above applications are incorporated herein by reference.

TECHNICAL FIELD

The present disclosure relates to a testing method and a testing apparatus for measuring a Raman gain efficiency distribution in a few-mode optical fiber.

BACKGROUND ART

With an increase in large-capacity contents represented by movies and games, and the spread of smartphones, the traffic amount in optical fiber networks has been increasing annually. On the other hand, in a single mode fiber currently used for a transmission medium, the transmission capacity is close to the limit. Mode division multiplexing transmission using few-mode fibers is being focused upon as one of techniques for addressing a future increase in traffic. To extend a communication distance using the mode division multiplexing transmission, an amplification technique for each mode used in transmission is also being investigated.

In mode division multiplexing transmission using an optical amplification technique, a mode dependent gain (MDG) is a factor that degrades the transmission quality, and therefore, it is necessary to reduce the MDG to the utmost extent. The distributed Raman amplification technique in which a few-mode fiber itself used in transmission is used for an amplification medium is one of potential candidates for the amplification technique used for mode division multiplexing transmission because the MDG can be minimized by controlling an incident mode of excitation light amplifying signal light and optimizing the design of the optical fiber.

CITATION LIST

Patent Literature

PTL 1: JP 2017-203625A

Non Patent Literature

NPL 1: M. Ohashi et. al., "Longitudinal fiber parameter measurements of two-mode fiber links by using OTDR", ECOC2014, Th.1.4.5, 2014.
NPL 2: A. Nakamura et. al., "Effective mode field diameter for LP11 mode and its measurement technique," IEEE Photon. Technol Lett., vol. 28, no. 22, pp. 2553-2556, 2016.

SUMMARY OF THE INVENTION

Technical Problem

On the other hand, it is known that the amplification efficiency (Raman gain efficiency) in the distributed Raman amplification technique depends on an electric field distribution of each mode propagating through an optical fiber, and an added quantity of dopant added to a core. The electric field distribution of each mode and the added quantity of dopant vary depending on differences in optical fiber manufacturer and differences in manufacturing lot even in the same manufacturer, and therefore, a longitudinal Raman gain efficiency variation may occur if an optical fiber transmission path to be used in a mode division multiplexing transmission system is actually constructed. Thus, there is a need for techniques for testing a Raman gain efficiency distribution of few-mode fibers used in transmission to design and evaluate a mode division multiplexing transmission system using distributed Raman amplification.

The present invention has been made in view of the above circumstances, and an object thereof is to provide a Raman gain efficiency distribution testing method and a Raman gain efficiency distribution testing apparatus for measuring a Raman gain efficiency distribution of a fundamental mode and a first high-order mode in a few-mode fiber.

Means for Solving the Problem

To achieve the above object, a Raman gain efficiency distribution testing method and testing apparatus according to the present invention acquire a mode field diameter (corresponding to the magnitude of the electric field distribution) of each mode in the longitudinal direction of the few-mode fiber, and a relative refractive index difference (corresponding to an added quantity of dopant) between a core and a clad, and calculate a Raman gain efficiency distribution from the acquired values.

Specifically, a Raman gain efficiency distribution testing method according to the present invention includes using a computing processor to perform, on the basis of information of return light resulting from a test optical pulse being incident on a tested optical fiber and having a wavelength of signal light and a wavelength of excitation light that are shorter than an effective cutoff wavelength of the tested optical fiber, a relative refractive index difference calculation procedure of acquiring a relative refractive index difference between a core and a clad at an arbitrary position z in a longitudinal direction of the tested optical fiber, a mode field diameter calculation procedure of acquiring a mode field diameter of a fundamental mode and a mode field diameter of a first high-order mode at the arbitrary position z in the longitudinal direction of the tested optical fiber for each of the wavelength of the signal light and the wavelength of the excitation light, a Raman gain coefficient computation procedure of computing a Raman gain coefficient of the tested optical fiber from a Raman gain coefficient of a pure quartz core optical fiber at an excitation wavelength of 1 µm, the wavelength of the excitation light, and the relative refractive index difference between the core and the clad at the arbitrary position z acquired in the relative refractive index difference calculation procedure, an electric field distribution overlap integral computation procedure of computing an electric field distribution overlap integral at the arbitrary position z, between a set of modes and another set of modes, of the mode field diameter of a mode of the set of modes at the wavelength of the signal light and the mode field diameter of a mode of the other set of modes at the wavelength of the excitation light which are acquired in the mode field diameter calculation procedure, the set of modes and the other set of modes each including the fundamental mode and a plurality of the first high-order modes, and a Raman gain efficiency computation procedure of computing a product of the Raman gain coefficient and the electric field distribution overlap integral to acquire a Raman gain efficiency, between a mode of the set of modes and a mode of the other set of modes, of the signal light and the excitation light at the arbitrary position z.

A Raman gain efficiency distribution testing apparatus according to the present invention includes a test light injector configured to emit a test optical pulse having a wavelength of signal light and a wavelength of excitation light that are shorter than an effective cutoff wavelength of a tested optical fiber, to the tested optical fiber, a return light receiver configured to receive return light being separated into modes, being generated in the tested optical fiber, and resulting from the test optical pulse, and a computing processor configured to acquire a relative refractive index difference between a core and a clad at an arbitrary position z in a longitudinal direction of the tested optical fiber, acquire a mode field diameter of a fundamental mode and a mode field diameter of a first high-order mode at the arbitrary position z in the longitudinal direction of the tested optical fiber for each of the wavelength of the signal light and the wavelength of the excitation light, compute a Raman gain coefficient of the tested optical fiber from a Raman gain coefficient of a pure quartz core optical fiber at an excitation wavelength of 1 µm, the wavelength of the excitation light, and the relative refractive index difference between the core and the clad at the arbitrary position z, compute an electric field distribution overlap integral at the arbitrary position z, between a set of modes and another set of modes, of the mode field diameter of a mode of the set of modes at the wavelength of the signal light, and the mode field diameter of a mode of the other set of modes at the wavelength of the excitation light, the set of modes and the other set of modes each including the fundamental mode and a plurality of the first high-order modes, and compute a product of the Raman gain coefficient and the electric field distribution overlap integral to acquire a Raman gain efficiency, between a mode of the set of modes and a mode of the other set of modes, of the signal light and the excitation light at the arbitrary position z, based on the return light received by the light receiver.

A mode field diameter of each mode in a longitudinal direction of a few-mode fiber and a relative refractive index difference between a core and a clad can be calculated by analyzing return light of a test optical pulse incident on the few-mode fiber. Thus, the present invention can provide a Raman gain efficiency distribution testing method and a Raman gain efficiency distribution testing apparatus for measuring a Raman gain efficiency distribution of a fundamental mode and a first high-order mode in a few-mode fiber.

The detailed operation is as described below.
The tested optical fiber is a quartz optical fiber in which $GeO_2$ is added to a core, and a Raman gain coefficient is computed according to equation C1 in the Raman gain coefficient computation procedure:

[Math. C1]

$$g_R = \frac{g_0(1 + 80\Delta)}{\lambda_P} \quad (C1)$$

where $g_0$ is a Raman gain coefficient of a pure quartz core optical fiber at an excitation wavelength of 1 µm, $\Delta$ is a relative refractive index difference between a core and a clad, and $\lambda p$ is a wavelength of excitation light.

In the electric field distribution overlap integral computation procedure, the electric field distribution overlap integrals are computed according to equation C2 to equation C6:

[Math. C2]

$$F_{11} = \frac{2}{\pi[w_1^2(\lambda_S) + w_1^2(\lambda_P)]} \quad (C2)$$

[Math. C3]

$$F_{12} = F_{13} = \frac{2w_1^2(\lambda_S)}{\pi[w_1^2(\lambda_S) + w_2^2(\lambda_P)]^2} \quad (C3)$$

[Math. C4]

$$F_{21} = F_{31} = \frac{2w_2^2(\lambda_S)}{\pi[w_2^2(\lambda_S) + w_1^2(\lambda_P)]^2} \quad (C4)$$

[Math. C5]

$$F_{22} = F_{33} = \frac{6w_2^2(\lambda_S)w_2^2(\lambda_P)}{\pi[w_2^2(\lambda_S) + w_2^2(\lambda_P)]^3} \quad (C5)$$

[Math. C6]

$$F_{23} = F_{32} = \frac{2w_2^2(\lambda_S)w_2^2(\lambda_P)}{\pi[w_2^2(\lambda_S) + w_2^2(\lambda_P)]^3} \quad (C6)$$

where
$w_1(\lambda_s)$ is a mode field diameter of a fundamental mode (LP01) of the signal light,
$w_1(\lambda_p)$ is a mode field diameter of the fundamental mode (LP01) of the excitation light,
$w_2(\lambda_s)$ is a mode field diameter of a first high-order mode (LP11a or LP11b) of the signal light,
$w_2(\lambda_p)$ is a mode field diameter of the first high-order mode (LP11a or LP11b) of the excitation light,
$F_{ij}$ is an electric field distribution overlap integral between modes i and j,
i=1 represents the fundamental mode (LP01) of the signal light,
i=2 represents the first high-order mode (LP11a) of the signal light,
i=3 represents the first high-order mode (LP11b) of the signal light,
j=1 represents the fundamental mode (LP01) of the excitation light,
j=2 represents the first high-order mode (LP11a) of the excitation light, and
j=3 represents the first high-order mode (LP11b) of the excitation light.

Effects of the Invention

The present invention is capable of providing a Raman gain efficiency distribution testing method and a Raman gain efficiency distribution testing apparatus for measuring a Raman gain efficiency distribution of a fundamental mode and a first high-order mode in a few-mode fiber.

DESCRIPTION OF EMBODIMENTS

Hereinafter, embodiments of the present disclosure will be described with reference to the drawings. The embodiments described below are examples of the present invention, and the present invention is not limited to the following embodiments. In the present specification and the drawings, constituent elements having identical reference signs are assumed to be the same.

Figure 1:
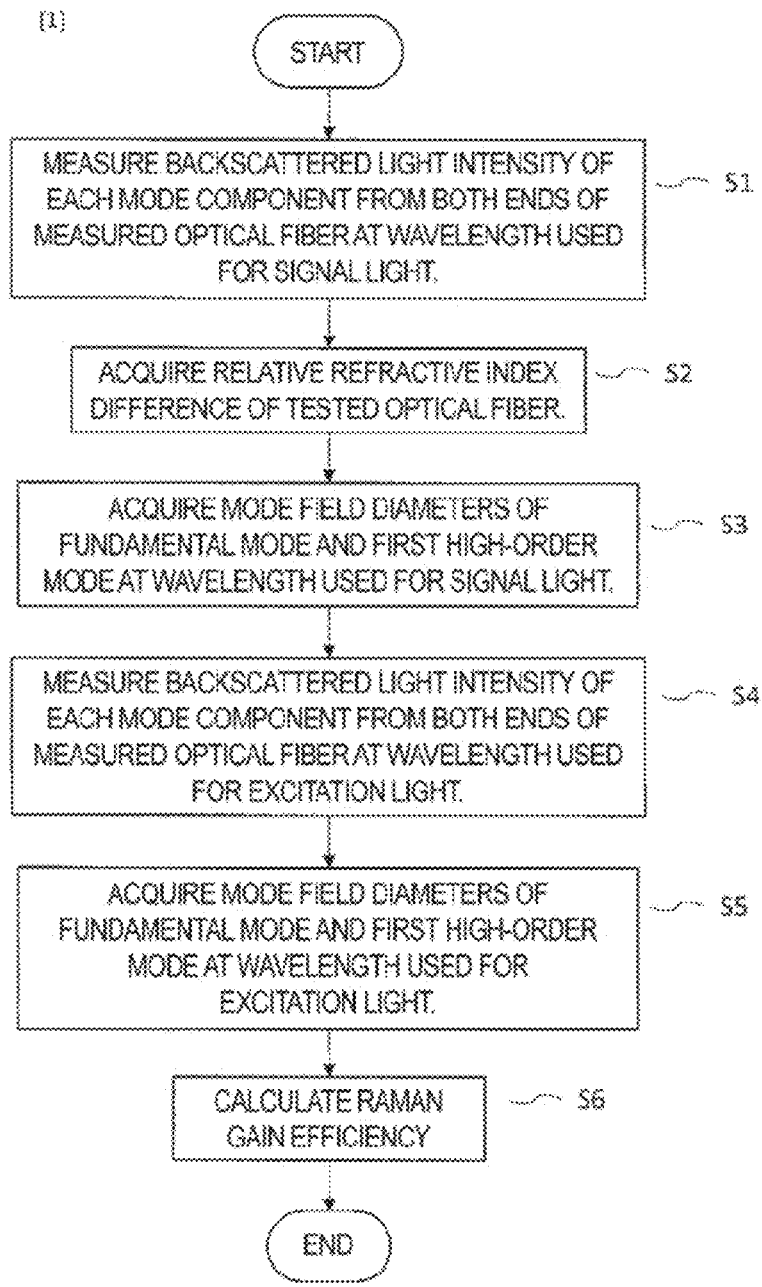
FIG. 1 is a flowchart describing a Raman gain efficiency distribution testing method according to the present invention.

FIG. 1 is a flowchart describing a Raman gain efficiency distribution testing method according to the present embodiment. The Raman gain efficiency distribution testing method includes step S1 to step S6.

In step S1, the backscattered light intensity of each mode component is measured at a wavelength used for signal light from both ends of a measured optical fiber.

In step S2, a relative refractive index difference between a core and a clad of the tested optical fiber is acquired.

In step S3, mode field diameters of a fundamental mode and a first high-order mode at the wavelength used for signal light are acquired.

In step S4, the backscattered light intensity of each mode component is measured at a wavelength used for excitation light from both ends of the measured optical fiber.

In step S5, mode field diameters of the fundamental mode and the first high-order mode at the wavelength used for the excitation light are acquired.

In step S6, a Raman gain efficiency is calculated.

In other words, according to the Raman gain efficiency distribution testing method, the Raman gain efficiency is calculated by sequentially performing procedures described below based on information of return light resulting from a test optical pulse incident on a tested optical fiber and having a wavelength of signal light and a wavelength of excitation light that are shorter than an effective cutoff wavelength of the tested optical fiber (steps S1, S4).

In a relative refractive index difference calculation procedure (step S2), a computing processor acquires a relative refractive index difference between a core and a clad at an arbitrary position z in a longitudinal direction of the tested optical fiber.

In a mode field diameter calculation procedure (steps S3, S5), a mode field diameter of a fundamental mode and a mode field diameter of a first high-order mode at the arbitrary position z in the longitudinal direction of the tested optical fiber are acquired for each of the wavelength of the signal light and the wavelength of the excitation light.

In a Raman gain coefficient computation procedure, a Raman gain coefficient of the tested optical fiber is computed from a Raman gain coefficient of a pure quartz core optical fiber at an excitation wavelength of 1 μm, the wavelength of the excitation light, and the relative refractive index difference between the core and the clad at the arbitrary position z acquired in the relative refractive index difference calculation procedure.

In an electric field distribution overlap integral computation procedure, an electric field distribution overlap integral at the arbitrary position z between the mode field diameter at the wavelength of the signal light and the mode field diameter at the wavelength of the excitation light acquired for each mode in the mode field diameter calculation procedure is computed for any mode combination.

In a Raman gain efficiency computation procedure (step S6), the product of the Raman gain coefficient and the electric field distribution overlap integral is computed, and a Raman gain efficiency of the signal light and the excitation light is acquired at the arbitrary position z for any mode combination.

The Raman gain efficiency distribution testing method will be described in detail. The Raman gain efficiency distribution testing method includes procedures described below.

In a "first generation procedure", a test optical pulse having a wavelength used as signal light in a fundamental mode and in a first high-order mode capable of being propagated through a tested optical fiber is generated.

In a "first incident procedure", the test optical pulse generated in the first generation procedure is incident on one end of the tested optical fiber in any mode.

In a "first mode demultiplexing procedure", return light of the test optical pulse incident on the one end of the tested optical fiber in the first incident procedure is separated into a fundamental mode and a first high-order mode.

In a "first light intensity acquisition procedure", each mode component of the return light separated in the first mode demultiplexing procedure is photoelectrically converted, and a first intensity distribution of each mode component of the return light with respect to a distance from the one end of the tested optical fiber is acquired.

In a "second incident procedure", the test optical pulse generated in the first generation procedure is incident on the other end of the tested optical fiber in any mode.

In a "second mode demultiplexing procedure", return light of the test optical pulse incident on the other end of the tested optical fiber in the second incident procedure is separated into a fundamental mode and a first high-order mode.

In a "second light intensity acquisition procedure", each mode component of the return light separated in the second mode demultiplexing procedure is photoelectrically converted, and a second intensity distribution of each mode component of the return light with respect to a distance from the one end of the tested optical fiber is acquired.

In a "relative refractive index difference calculation procedure", an arithmetic mean of a logarithmically converted intensity of each mode component of the return light at an arbitrary position of the tested optical fiber is calculated from the first intensity distribution acquired in the first light intensity acquisition procedure and the second intensity distribution acquired in the second light intensity acquisition procedure, and a relative refractive index difference between a core and a clad of the tested optical fiber is acquired based on the arithmetic mean of the logarithmically converted intensity of the fundamental mode.

In a "signal light wavelength mode field diameter calculation procedure", an arithmetic mean of the logarithmically converted intensity of each mode component of the return light at an arbitrary position of the tested optical fiber is calculated from the first intensity distribution acquired in the first light intensity acquisition procedure and the second intensity distribution acquired in the second light intensity acquisition procedure, and a mode field diameter of the fundamental mode and a mode field diameter of the first high-order mode at a wavelength of the signal light are acquired based on a difference between the arithmetic mean of the logarithmically converted intensity of the fundamental mode and the arithmetic mean of the logarithmically converted intensity of the first high-order mode.

In a "second generation procedure", a test optical pulse having a wavelength used as excitation light in a fundamental mode and in a first high-order mode capable of being propagated through the tested optical fiber is generated.

In a "third incident procedure", the test optical pulse generated in the second generation procedure is incident on one end of the tested optical fiber in any mode.

In a "third mode demultiplexing procedure", return light of the test optical pulse incident on the one end of the tested optical fiber in the third incident procedure is separated into a fundamental mode and a first high-order mode.

In a "third light intensity acquisition procedure", each mode component of the return light separated in the third mode demultiplexing procedure is photoelectrically converted, and a third intensity distribution of each mode component of the return light with respect to a distance from the one end of the tested optical fiber is acquired.

In the "fourth incident procedure", the test optical pulse generated in the second generation procedure is incident on the other end of the tested optical fiber in any mode.

In a "fourth mode demultiplexing procedure", return light of the test optical pulse incident on the other end of the tested optical fiber in the fourth incident procedure is separated into a fundamental mode and a first high-order mode.

In a "fourth light intensity acquisition procedure", each mode component of the return light separated in the fourth mode demultiplexing procedure is photoelectrically converted, and a fourth intensity distribution of each mode component of the return light with respect to a distance from the one end of the tested optical fiber is acquired.

In an "excitation light wavelength mode field diameter calculation procedure", an arithmetic mean of a logarithmically converted intensity of each mode component of the return light at an arbitrary position of the tested optical fiber is calculated from the third intensity distribution acquired in the third light intensity acquisition procedure and the fourth intensity distribution acquired in the fourth light intensity acquisition procedure, and a mode field diameter of the fundamental mode and a mode field diameter of the first high-order mode at a wavelength of the excitation light are acquired based on a difference between the arithmetic mean of the logarithmically converted intensity of the fundamental mode and the arithmetic mean of the logarithmically converted intensity of the first high-order mode.

In a "Raman gain efficiency calculation procedure", a Raman gain efficiency is calculated from the relative refractive index difference acquired in the relative refractive index difference calculation procedure, the signal light wavelength mode field diameter acquired in the signal light wavelength mode field diameter calculation procedure, and the excitation light wavelength mode field diameter acquired in the excitation light wavelength mode field diameter calculation procedure.

In step S1, the backscattered light intensity distributions of a fundamental mode and a first high-order mode are measured at a wavelength used as signal light from both ends of the tested optical fiber by using a backscattered light measurement technique as described in NPL 1, NPL 2, and PTL 1. Step S1 is the first generation procedure of the test optical pulse at the signal light wavelength, the first incident procedure thereof, the first mode demultiplexing procedure thereof, the first light intensity acquisition procedure thereof, the second incident procedure thereof, the second mode demultiplexing procedure thereof, and the second light intensity acquisition procedure thereof.

In step S2, a relative refractive index difference between a core and a clad of the tested optical fiber is calculated from a measured waveform. Step S2 is the relative refractive index difference calculation procedure. An example of calculating the relative refractive index difference between the core and the clad is described in NPL 1 (see equation A15 in Appendix 1).

In step S3, a mode field diameter of each mode at a wavelength used for signal light is calculated from a measured waveform. Step S3 is the signal light wavelength mode field diameter calculation procedure in the signal light wavelength. An example of calculating the mode field diameter is described in NPL 2 and PTL 1 (see equation 25 in Appendix 2).

In step S4, the backscattered light intensity distributions of the fundamental mode and the first high-order mode are measured from both ends of the tested optical fiber at a wavelength used as excitation light. Step S4 is the second generation procedure of the test optical pulse at the excitation light wavelength, the third incident procedure thereof, the third mode demultiplexing procedure thereof, the third light intensity acquisition procedure thereof, the fourth incident procedure thereof, the fourth mode demultiplexing procedure thereof, and the fourth light intensity acquisition procedure thereof.

In step S5, a mode field diameter of each mode at a wavelength used for excitation light is calculated from a measured waveform. Step S5 is the excitation light wavelength mode field diameter calculation procedure. The procedure for calculating the mode field diameter is similar in detail to that in step S3.

Finally, in step S6, a Raman gain efficiency distribution is calculated by analyzing the relative refractive index difference distribution calculated in step S2 and the mode field diameter distribution calculated in step S3 and step S5. Step S6 is the Raman gain efficiency calculation procedure. The procedure for calculating the Raman gain efficiency will be described in detail below.

Figure 2:
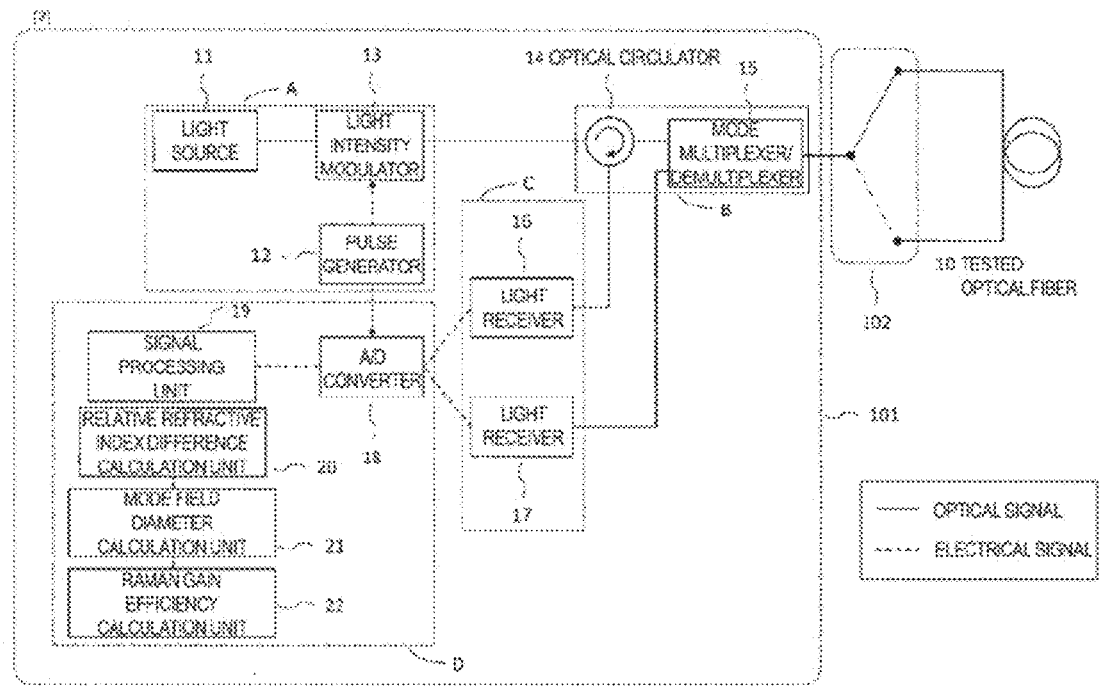
FIG. 2 is a diagram illustrating a Raman gain efficiency distribution testing apparatus according to the present invention.

FIG. 2 is a diagram illustrating a configuration example of a Raman gain efficiency distribution testing apparatus 101 according to the present embodiment. The Raman gain efficiency distribution testing apparatus 101 includes a test light injector (a generation unit A and a mode multiplexing/demultiplexing unit B), a return light receiver (the mode multiplexing/demultiplexing unit B and a light receiving unit C), and a computing processor (a computation processing unit D) described below.

The test light injector (the generation unit A and the mode multiplexing/demultiplexing unit B) emits a test optical pulse having a wavelength of signal light and a wavelength of excitation light that are shorter than an effective cutoff wavelength of a tested optical fiber 10, to the tested optical fiber 10.

Return light generated in the tested optical fiber 10 by the return light receiver (the mode multiplexing/demultiplexing unit B and the light receiving unit C) and the test optical pulse is received for each mode.

The computing processor (computation processing unit D) acquires a relative refractive index difference between a core and a clad at an arbitrary position z in a longitudinal direction of the tested optical fiber 10, acquires a mode field diameter of a fundamental mode and a mode field diameter of a first high-order mode at the arbitrary position z in a longitudinal direction of the tested optical fiber 10 for each of the wavelength of the signal light and the wavelength of the excitation light, computes a Raman gain coefficient of the tested optical fiber 10 from a Raman gain coefficient of a pure quartz core optical fiber at an excitation wavelength of 1 μm, the wavelength of the excitation light, and the relative refractive index difference between the core and the clad at the arbitrary position z, computes an electric field distribution overlap integral at the arbitrary position z between the mode field diameter of each mode at the wavelength of the signal light, and the mode field diameter of each mode at the wavelength of the excitation light, for any mode combination, and computes a product of the Raman gain coefficient and the electric field distribution overlap integral, and acquires a Raman gain efficiency between the signal light and the excitation light at the arbitrary position z for any mode combination, based on the return light received by the light receiver.

The Raman gain efficiency distribution testing apparatus 101 inputs, to the tested optical fiber 10, an optical pulse having wavelengths used as signal light or excitation light. The wavelengths are shorter than the effective cutoff wavelength of the tested optical fiber 10, and not only the fundamental mode but also the first high-order mode can be propagated through the tested optical fiber 10.

The generation unit A generates a test optical pulse having wavelengths propagating as signal light and excitation light through the tested optical fiber 10. The generation unit A includes a light source 11, a pulse generator 12, and a light intensity modulator 13. The light source 11 can selectively output either of the two wavelengths of the signal light and the excitation light, and the output continuous light is converted to pulses by the light intensity modulator 13 according to a signal from the pulse generator 12. The light source 11 is, for example, a variable wavelength light source or two single wavelength light sources. The light intensity modulator 13 is, for example, an acoustic optical modulator including an acoustic optical switch for providing a pulse drive to an acoustic optical element. In the present embodiment, an example is given of a case in which the tested optical fiber 10 operates in two modes at the wavelength of the continuous light output from the light source 11.

The mode multiplexing/demultiplexing unit B emits a test optical pulse being generated by the generation unit A and having either one of the wavelengths propagating as the signal light and the excitation light, to the tested optical fiber 10 in any mode, and separates return light resulting from the test optical pulse into a fundamental mode and a first high-order mode. The mode multiplexing/demultiplexing unit B includes an optical circulator 14 and a mode multiplexer/demultiplexer 15. The test optical pulse generated by the light intensity modulator 13 is emitted to the mode multiplexer/demultiplexer 15 via the optical circulator 14. The mode multiplexer/demultiplexer 15 is a mode multiplexer/demultiplexer including a directional coupler including a planar lightwave circuit as described in NPL 2 and PTL 1. The test optical pulse is converted to any mode by the mode multiplexer/demultiplexer 15 and is emitted to one end or the other end of the tested optical fiber 10.

When the test optical pulse incident in the fundamental mode propagates through the tested optical fiber 10, a part of the test optical pulse is coupled to the fundamental mode and the first high-order mode propagating in the reverse direction (the fundamental mode and first high-order mode of the backscattered light) by Rayleigh scattering. The return light (backscattered light) is emitted again to the mode multiplexer/demultiplexer 15. At this time, mode components of the fundamental mode and the first high-order mode of the return light are separated by the mode multiplexer/demultiplexer 15.

An optical switch 102 is arranged between the optical pulse testing apparatus 101 and the tested optical fiber 10, and has a function of selectively switching between one end and the other end of the tested optical fiber 10 connected to the optical pulse testing apparatus 101.

The light receiving unit C photoelectrically converts each of mode components of the return light separated by the mode multiplexing/demultiplexing unit B. The light receiving unit C has two light receivers (16, 17). Of the return light separated for each mode by the mode multiplexer/demultiplexer 15, one mode component (for example, a fundamental mode component) is emitted to the light receiver 16 via the optical circulator 14, another mode component (for example, a first high-order mode component) is emitted to the light receiver 17, and the mode components are photoelectrically converted.

The computation processing unit D includes a relative refractive index difference calculation unit 20, a mode field diameter calculation unit 21, and a Raman gain efficiency calculation unit 22, as described below.

The relative refractive index difference calculation unit 20 acquires a first intensity distribution of each of mode components of the return light with respect to a distance from one end of the tested optical fiber 10 when the test optical pulse is incident on one end of the tested optical fiber 10 in any mode, and a second intensity distribution of each of mode components of the return light with respect to a distance from one end of the tested optical fiber 10 when the test optical pulse is incident on the other end of the tested optical fiber 10 in any mode, calculates an arithmetic mean of a logarithmically converted intensity of each of mode components of the return light at an arbitrary position of the tested optical fiber 10 from the first intensity distribution and the second intensity distribution, and acquires a relative refractive index difference of the tested optical fiber 10 based on the arithmetic mean of the logarithmically converted intensity of the fundamental mode.

The mode field diameter calculation unit 21 acquires mode field diameters of the fundamental mode and the first high-order mode based on a difference between the arithmetic mean of the logarithmic converted intensity of the fundamental mode and the arithmetic mean of the logarithmically converted intensity of the first high-order mode.

The Raman gain efficiency calculation unit 22 acquires a Raman gain efficiency from the relative refractive index difference and the mode field diameter of each mode at wavelengths that propagate as the signal light and the excitation light acquired by the relative refractive index difference calculation unit 20 and the mode field diameter calculation unit 21.

In the computation processing unit D, electrical signals from the light receivers 16 and 17 are converted to digital data by an A/D converter 18. The digital data is input to a signal processing unit 19.

The signal processing unit 19 acquires intensity distributions S1(z) and S2(z) for the fundamental mode and the first high-order mode components of the return light.

In addition, the relative refractive index difference calculation unit 20 acquires the relative refractive index difference of the tested optical fiber by the technique described in NPL 1 (see Appendix 1). As described in NPL 2 and PTL 1, the mode field diameter calculation unit 21 acquires the mode field diameter of each mode from an arithmetic mean value $I_1(z)$ of logarithmically converted intensity distribution for the fundamental mode component of the return light measured from one end and the other end, and an arithmetic mean value $I_2(z)$ of logarithmically converted intensity distribution for the first high-order mode component of the return light measured from one end and the other end (see Appendix 2).

The Raman gain efficiency calculation unit 22 performs a computation process of calculating a Raman gain efficiency from the acquired relative refractive index difference and the mode field diameter of each mode at wavelengths that propagate as the signal light and the excitation light.

Hereinafter, a computation process of calculating the Raman gain efficiency will be described.

Herein, a quartz optical fiber in which $GeO_2$ is added to a core is assumed as a tested optical fiber.

A Raman gain efficiency $\eta_R$ of the optical fiber is represented by the product of a Raman gain coefficient $g_R$ and an electric field distribution overlap integral F between modes.

[Math. B0]

$$\eta_R = g_R \cdot F_{ij} \quad (B0)$$

Here, the Raman gain coefficient $g_R$ of the quartz optical fiber in which $GeO_2$ is added to the core is represented by the following equation:

[Math. B1]

$$g_R = \frac{g_0(1 + 80\Delta)}{\lambda_p} \quad (B1)$$

where $g_0$ is a Raman gain coefficient of a pure quartz core optical fiber at an excitation wavelength of 1 μm, $\Delta$ is a relative refractive index difference, and $\lambda_p$ is a wavelength of excitation light.

Also, an electric field distribution overlap integral F between modes is represented by the following equation:

[Math. B2]

$$F_{ij} = \frac{\int_{-\infty}^{\infty}\int_{-\infty}^{\infty} |E_{s(i)}(x,y)|^2 |E_{p(j)}(x,y)|^2 dxdy}{\int_{-\infty}^{\infty}\int_{-\infty}^{\infty} |E_{s(i)}(x,y)|^2 dxdy \int_{-\infty}^{\infty}\int_{-\infty}^{\infty} |E_{p(j)}(x,y)|^2 dxdy} \quad (B2)$$

where $E_s$ and $E_p$ are electric field distributions of signal light and excitation light respectively, and i and j represent the order of a mode.

Here, if the electric field distributions of the fundamental mode and two orthogonal first high-order modes are approximated by the Gaussian distribution and the Hermite Gaussian distribution, the electric field distributions are represented by the following equations:

[Math. B3]

$$E_{(1)}(x, y) = \sqrt{\frac{2}{\pi w_1^2}} \exp\left(-\frac{x^2+y^2}{w_1^2}\right) \quad (B3)$$

[Math. B4]

$$E_{(2)}(x, y) = \sqrt{\frac{2}{\pi}\frac{2}{w_2^2}} x \exp\left(-\frac{x^2+y^2}{w_2^2}\right) \quad (B4)$$

[Math. B5]

$$E_{(3)}(x, y) = \sqrt{\frac{2}{\pi}\frac{2}{w_2^2}} y \exp\left(-\frac{x^2+y^2}{w_2^2}\right) \quad (B5)$$

where $E_{(1)}$ is an electric field distribution of the fundamental mode, $E_{(2)}$ and $E_{(3)}$ are respectively electric field distributions of the two orthogonal first high-order modes, $w_1$ and $w_2$ are mode field diameters of the fundamental mode and the first high-order mode respectively, and x and y are coordinates with the origin being the center of the optical fiber cross section.

Figure 3:
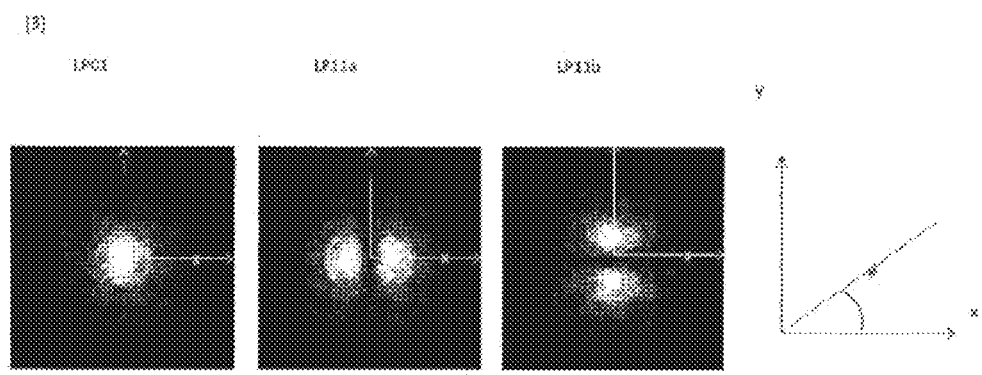
FIG. 3 is graphical representations illustrating a relationship of light intensity distributions of a fundamental mode and a first high-order mode with the xy coordinates.

FIG. 3 is graphical representations illustrating a relationship of the light intensity distributions of the fundamental mode and the two orthogonal first high-order modes with the xy coordinates.

Here, according to equations (B2) to (B5), the electric field distribution overlap integral F between modes can be represented by the following equations.

[Math. B6]

$$F_{11} = \frac{2}{\pi[w_1^2(\lambda_s) + w_1^2(\lambda_p)]} \quad (B6)$$

[Math. B7]

$$F_{12} = F_{13} = \frac{2w_1^2(\lambda_s)}{\pi[w_1^2(\lambda_s) + w_2^2(\lambda_p)]^2} \quad (B7)$$

[Math. B8]

$$F_{21} = F_{31} = \frac{2w_2^2(\lambda_s)}{\pi[w_2^2(\lambda_s) + w_1^2(\lambda_p)]^2} \quad (B8)$$

[Math. B9]

$$F_{22} = F_{33} = \frac{6w_2^2(\lambda_s)w_2^2(\lambda_p)}{\pi[w_2^2(\lambda_s) + w_2^2(\lambda_p)]^3} \quad (B9)$$

[Math. B10]

$$F_{23} = F_{32} = \frac{2w_2^2(\lambda_s)w_2^2(\lambda_p)}{\pi[w_2^2(\lambda_s) + w_2^2(\lambda_p)]^3} \quad (B10)$$

From equations (B1) and (B6) to (B10), the Raman gain efficiency for each mode can be represented as a function of the "relative refractive index difference of a tested optical fiber" and the "mode field diameter of each mode at wavelengths of signal light and excitation light".

Thus, it is possible to calculate the Raman gain efficiency from the relative refractive index difference and the mode field diameter acquired in the relative refractive index difference calculation procedure, the mode field diameter calculation procedure at the signal light wavelength, and the mode field diameter calculation procedure at the excitation light wavelength.

OTHER EMBODIMENTS

The present invention is not limited to the above-described embodiment, and various modifications can be made without departing from the gist of the present invention.

In short, the invention is not limited to the above-described embodiment as it is, and can be embodied with the components modified without departing from the scope of the disclosure when implemented. For example, the computation processing unit D can be realized by a computer and a program and the program can be recorded on a recording medium or can be provided through a network.

Furthermore, various inventions can be formed by appropriate combinations of a plurality of components disclosed in the above-described embodiment. For example, several components may be deleted from all of the components illustrated in the embodiment. Furthermore, components of different embodiments may be appropriately combined with each other.

Appendix 1

Here, an example of the relative refractive index difference calculation procedure will be described.

The power of LP01 and LP11 modes along a length direction z of a two-mode fiber (TMF) can be represented as the following coupled power equations:

[Math. A1]
$$\frac{dP_1}{dz} = -\alpha_1 P_1 + h(P_2 - P_1) \tag{A1}$$

[Math. A2]
$$\frac{dP_2}{dz} = -\alpha_2 P_2 + h(P_1 - P_2) \tag{A2}$$

wherein P1 and P2 indicate the power of the LP01 and LP11 modes respectively. $\alpha 1$ and $\alpha 2$ are an optical loss of the modes, and h is a mode coupling coefficient between the LP01 mode and the LP11 mode. Here, $\alpha 1 = \alpha 2 = \alpha$.

For boundary conditions P1(0)=P0 and P2(0)=0, the following equations are obtained:

[Math. A3]
$$P_1(z) = \frac{P_0}{2}\exp(-\alpha z)\left[1 + \exp\left\{-\int_0^z 2h(x)dx\right\}\right] \tag{A3}$$

[Math. A4]
$$P_2(z) = \frac{P_0}{2}\exp(-\alpha z)\left[1 - \exp\left\{-\int_0^z 2h(x)dx\right\}\right] \tag{A4}$$

The following mode coupling coefficient h* is an average mode coupling coefficient across the entire fiber length z.

[Math. A5]
$$h^* = \frac{1}{z}\int_0^z h(x)dx \tag{A5}$$

Take into consideration the power of the backscattered light of the LP01 and LP11 modes in the TMF at a position z. Powers Pb1(z) and Pb2(z) of the backscattered light at the position z of the TMF can be represented as follows:

[Math. A6]
$$P_{b1}(z) = \frac{P_0}{2}\alpha_s(z)B_1(z)\exp(-2\alpha z)[1 + \exp(-4h^*z)] \tag{A6}$$

-continued

[Math. A7]
$$P_{b2}(z) = \frac{P_0}{2}\alpha_s(z)B_2(z)\exp(-2\alpha z)[1 - \exp(-4h^*z)] \tag{A7}$$

where $\alpha s$ is a local scattering coefficient and Bi (i=1, 2) is a backscattering capture ratio. Here, it is assumed that B1=B2=B.

Figure 4:
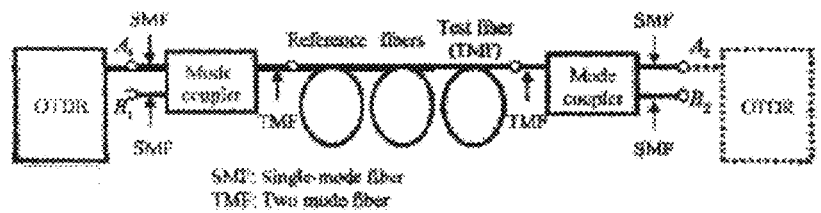
FIG. 4 is a diagram illustrating a technique for measuring a mode crosstalk in an OTDR.

FIG. 4 is a diagram illustrating a technique for measuring a mode crosstalk in an OTDR.

Figure 5:
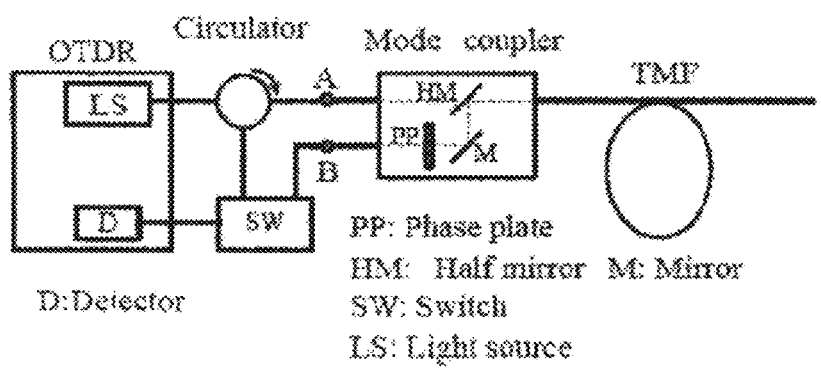
FIG. 5 is a diagram illustrating a technique for measuring a fiber parameter in a longitudinal direction.

As illustrated in FIG. 4, a mode coupler functions as a mode converter and a mode combiner. The LP01 mode that enters into the mode coupler from a port B is converted to the LP11 mode. FIG. 5 is a diagram illustrating a technique for measuring a fiber parameter in the longitudinal direction.

As illustrated in FIG. 5, a tested TMF is inserted between the mode couplers. OTDR signals S1(z) (=10 log Pb1(z)) and S3(z) (=10 log Pb3(z)) of the LP01 mode emitted from both ends of the fiber length L can be represented by the following equations.

[Math. A8]
$$S_1(z) = 10\log P_0 + 10\log(\alpha_s(z)) + \\ 10\log(B(z)) - 2\alpha z 10\log e + 10\log\left[\frac{1 + \exp[-4h^*z]}{2}\right] \tag{A8}$$

[Math. A9]
$$S_3(z) = 10\log P_3 + 10\log(\alpha_s(z)) + 10\log(B(z)) - \\ 2\alpha(L-z)10\log e + 10\log\left[\frac{1 + \exp[-4h^*(L-z)]}{2}\right] \tag{A9}$$

Equations (A8) and (A9) include optical losses due to defects, power attenuation, and mode coupling. Thus, if a bi-directional OTDR is used to estimate a longitudinal fiber parameter of a TMF, it is necessary to know a loss due to mode coupling between modes. The mode coupling loss can be estimated from the backscattered power Pb1(z) and Pb2(z).

Reliable means for separating effects of optical power attenuation and waveguide defects from the OTDR signals have been reported (M. S. O' Sullivan and J. Ferner, "Interpretation of SM fiber OTDR signature," Proc. SPIE' 86, Vol. 661, p. 171 (1986).)

Thus, a defect contribution I(z) can be obtained by the following equation:

[Math. A10]
$$I(z) = \frac{S_1(z) + S_3(z)}{2} = 5\log P_0 P_3 + 10\log(\alpha_s(z)B(z)) - \\ 2\alpha L(10\log e) + 5\log\left\{\frac{[1 + \exp(-4h^*z)][1 + \exp[-4h^*(L-z)]]}{4}\right\} = \\ 5\log P_0 P_3 + 10\log(\alpha_s(z)B(z)) - 2\alpha L(10\log e) + 5\log C(z) \tag{A10}$$

where, C(z) indicates a loss due to mode coupling between modes.

A backscattering capture ratio B is represented by the following equation using a refractive index n of the core and MFD 2w($\lambda$, z):

[Math. A11]

$$B(\lambda, z) = \frac{3}{2}\log\left[\frac{\lambda}{2\pi n v(\lambda, z)}\right]^2 \quad (A11)$$

A change in the local scattering coefficient as is negligible compared to that in the MFD. The defect loss contribution In(z) of the core normalized by a value at a first reference point z=z0 can be represented by the following equation.

[Math. A12]

$$I_n(z) = I(z) - I(z_0) = 20\log\left(\frac{2w(\lambda, z_0)}{2w(\lambda, z)}\right) + 5\log\left(\frac{C(z)}{C(z_0)}\right) \quad (A12)$$

The second reference point z=z1 also satisfies the equation (A12). Thus, it is possible to estimate the MFD distribution of the TMF in the longitudinal direction using the normalized defect loss and MFD at the two reference points z0 and z1, according to the following equation.

[Math. A13]

$$2w(\lambda, z) = 2w(\lambda, z_0)\left[\frac{C(z)}{C(z_0)}\right]^{1/4} \times \left(\frac{2w(\lambda, z_1)}{2w(\lambda, z_0)}\left[\frac{C(z_0)}{Cz_1}\right]^{\frac{1}{4}}\right)^{\frac{I(z)-I(S_n)}{I(z_2)-I(S_n)}} \quad (A13)$$

The local scattering coefficient is proportional to the Rayleigh scattering coefficient. The Rayleigh scattering coefficient R for the $GeO_2$ added core fiber is represented by the following equation:

[Math. A14]

$$R = R_0(1 + k\Delta) \quad (A14)$$

where, R0 and $\Delta$ are a Rayleigh scattering coefficient of $SiO_2$ and a relative refractive index difference $\Delta$ represented in % respectively. The k value is experimentally estimated to be 0.62. The relative refractive index difference $\Delta(z)$ can be estimated by the same method as the MFD procedure using the MFD at the two reference points z0 and z1, and the relative refractive index difference.

[Math. A15]

$$\Delta(z) = \frac{1}{k}\left[(1+k\Delta(z_0))\left(\frac{2w(\lambda, z)}{2w(\lambda, z_0)}\right)^3 \right.$$
$$\left. \left(\frac{C(z_0)}{C(z)}\right)^{\frac{1}{2}} \times \frac{(1+k\Delta(z_1))}{(1+k\Delta(z_0))}\left(\frac{2w(\lambda, z_0)}{2w(\lambda, z_1)}\right)^2\left(\frac{C(z_1)}{C(z_0)}\right)^{\frac{1}{2}}\right]^{\frac{I(\lambda,z)-I(\lambda,z_0)}{I(\lambda,z_1)-I(\lambda,z_2)}} - 1\right] \quad (A15)$$

Appendix 2

Here, an example of the electric field distribution overlap integral computation procedure will be described.

The intensities $P_1(z)$ and $P_2(z)$ of the LP01 mode and the LP11 mode of backscattered light generated at a position of a distance z from one end of a tested optical fiber (two-mode optical fiber) are represented by the following equations:

[Math. 1]

$$P_1(z) = P_0\alpha_s(z)B_1(z)\exp[-2\int_0^z Y_1(x)dx] \quad (1)$$

[Math. 2]

$$P_2(z) = P_0\alpha_s(z)B_2(z)\exp[-\int_0^z \{Y_1(x)+Y_2(x)\}dx] \quad (2)$$

where $P_0$ represents the power of a test optical pulse incident on the tested optical fiber, $\alpha_s(z)$ represents the Rayleigh scattering coefficient at a distance z with respect to the test optical pulse propagating in the LP01 mode, $B_1(z)$ and $B_2(z)$ represent the backscattered light capture rates for the LP01 mode and the LP11 mode at the distance z, and $\gamma_1$ and $\gamma_2$ represent the loss coefficients for the LP01 mode and the LP11 mode at the distance z.

Here, the backscattered light intensities representing, in decibel, the intensities $P_1(z)$ and $P_2(z)$ of the LP01 mode and the LP11 mode of the backscattered light measured from one end of the tested optical fiber are represented as $S_1(z)$ and $S_2(z)$. In addition, the backscattered light intensities representing, in decibel, the intensities $P_1(z)$ and $P_2(z)$ of the LP01 mode and the LP11 mode of the backscattered light measured from the other end are represented as $S_1'(L-z)$ and $S_2'(L-z)$. Note that "L" is the total length of the tested optical fiber.

At this time, the arithmetic mean intensity $I_1(z)$ of the intensities $S_1(z)$ and $S_1'(z)$ of the backscattered light measured from both ends for the LP01 mode is represented by the following equation:

[Math. 3]

$$I_1(z) = \frac{s_1(z)+s_1(z)}{2} = 10\log[\alpha_s(z)B_1(z)] + a_1 \quad (3)$$

where $a_1$ is a constant not dependent on z, and is represented by the following equation.

[Math. 4]

$$a_1 = 10\log[P_0] - 10\log[\exp\{\int_0^L Y_1(x)dx\}] \quad (4)$$

Additionally, the arithmetic mean intensity $I_2(z)$ of the intensities $S_2(z)$ and $S_2'(z)$ of the backscattered light measured from both ends for the LP11 mode is represented by the following equation:

[Math. 5]

$$I_2(z) = \frac{s_2(z)+s_2(z)}{2} = 10\log[\alpha_s(z)B_2(z)] + a_2 \quad (5)$$

where $\alpha_2$ is a constant not dependent on z, and is represented by the following equation.

[Math. 6]

$$a_2 = 10\log[P_0] - 5\log[\exp\{\int_0^L [Y_1(x)+Y_2(x)]dx\}] \quad (6)$$

Supplement $S_1'(z)$ and $S_2'(z)$ are obtained by converting the intensities $S_1'(L-z)$ and $S_2'(L-z)$ of the LP01 mode and the LP11 mode of the backscattered light measured from the other end of the tested optical fiber into information from one end of the tested optical fiber.

Figure 6:
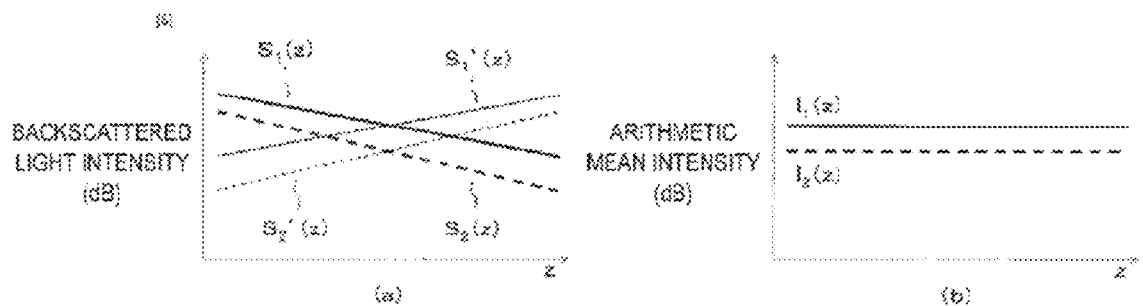
FIG. 6 is graphs illustrating relationships among $S_1(z)$, $S_1'(z)$, $S_2(z)$ and $S_2'(z)$, and a relationship between $I_1(z)$ and $I_2(z)$.

FIG. 6 is graphs illustrating relationships among $S_1(z)$, $S_1'(z)$, $S_2(z)$ and $S_2'(z)$, and a relationship between $I_1(z)$ and $I_2(z)$.

As described above, a difference between the arithmetic mean intensity $I_2(z)$ of the backscattered light for the LP11 mode and the arithmetic mean intensity $I_1(z)$ of the backscattered light for the LP01 mode is represented by the following equation:

[Math. 7]
$$I_2 - I_1 = 10\log\left[\frac{B_2(z)}{B_1(z)}\right] + K \quad (7)$$

where K indicates a difference in loss between the LP01 mode and the LP11 mode, and is represented by the following equation:

[Math. 8]
$$K = 5 \log[\exp\{\int_0^L Y_1(x) - Y_2(x)]dx\}] \quad (8)$$

where the second term on the right side in equation (7) is a constant not dependent on z, and therefore, a difference in the arithmetic mean intensities of the backscattered light for the LP11 mode and the LP01 mode changes according to the ratio of a capture rate $B_2(z)$ of the backscattered light for the LP11 mode and a capture rate $B_1(z)$ of the backscattered light for the LP01 mode.

Here, if the electric field distributions of the LP01 mode and the two orthogonal LP11 modes (hereinafter, called an LP11a mode and an LP11b mode) are approximated by the Gaussian distribution and the Hermite Gaussian distribution, the electric field distributions are represented by the following equations:

[Math. 9]
$$E_1 = \sqrt{\frac{2}{\pi w_1^2}} \exp\left(-\frac{x^2 + y^2}{w_1^2}\right) \quad (9)$$

[Math. 10]
$$E_2 = \sqrt{\frac{2}{\pi}} \frac{2}{w_2^2} x \cdot \exp\left(-\frac{x^2 + y^2}{w_2^2}\right) \quad (10)$$

[Math. 11]
$$E_3 = \sqrt{\frac{2}{\pi}} \frac{2}{w_2^2} y \cdot \exp\left(-\frac{x^2 + y^2}{w_2^2}\right) \quad (11)$$

where $E_1$, $E_2$, and $E_3$ represent the electric field distributions of the LP01, the LP11a, and the LP11b modes respectively, $w_1$ and $w_2$ represent the mode field diameter of the LP01 mode and the LP11 mode respectively, x and y represent the coordinates in the fiber cross-section.

Here, relationships between the light intensity distributions of the LP01, the LP11a, and the LP11b modes and the xy coordinates are as illustrated in FIG. 3.

As a test optical pulse propagates through a tested optical fiber, the test optical pulse is scattered in all directions at each position in the tested optical fiber. The scattered light intensity is known to be dependent on a scattering direction, and the ratio of scattering in a slight solid angle $d\Omega$ is represented by the following equation:

[Math. 12]
$$\tfrac{1}{16}(1/\cos^2\theta) \quad (12)$$

where $\theta$ represents a plane angle formed by the longitudinal direction of the tested optical fiber and the scattering direction, and a relationship between the plane angle $\theta$ and the solid angle $\Omega$ is represented by the following equation.

[Math. 13]
$$\Omega = 2\pi(1 - \cos\theta) \quad (13)$$

Figure 7:
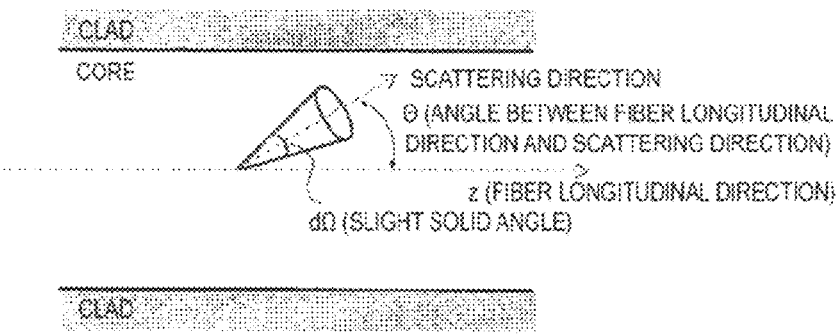
FIG. 7 is a diagram illustrating relationships among a longitudinal direction, a scattering direction, a plane angle θ, and a slight solid angle dΩ of an optical fiber.

FIG. 7 is a diagram illustrating relationships among the longitudinal direction, the scattering direction, the plane angle $\theta$, and the slight solid angle $d\Omega$ of the tested optical fiber. If the test optical pulse propagating in the LP01 mode is scattered in a direction of angle $\theta$, an electric field distribution $E_s$ of the scattered light on the xy plane is represented by the following equation:

[Math. 14]
$$E_s = E_1 \cdot \exp\left[-\frac{j2\pi n}{\lambda}(x\cos\phi + y\sin\phi)\sin\theta\right] \quad (14)$$

where n represents the refractive index of the tested optical fiber, $\lambda$ represents the wavelength of the test optical pulse, and $\phi$ represents the angle formed by the x-axis and the scattering direction.

The coupling efficiency of the scattered light and the propagation mode can be determined by the overlap integral of the electric field distributions of the scattered light and the propagation mode, and is approximated by the following equations:

[Math. 15]
$$T_1 = \frac{\int_{-\infty}^{\infty}\int_{-\infty}^{\infty} E_s \cdot E_1^* dxdy}{\int_{-\infty}^{\infty}\int_{-\infty}^{\infty} E_s^2 dxdy \cdot \int_{-\infty}^{\infty}\int_{-\infty}^{\infty} E_1^2 dxdy} \cong \exp\left[-\left(\frac{\pi n w_1 \sin\theta}{\lambda}\right)^2\right] \quad (15)$$

[Math. 16]
$$T_a = \frac{\left|\int_{-\infty}^{\infty}\int_{-\infty}^{\infty} E_s \cdot E_2^* dxdy\right|^2}{\int_{-\infty}^{\infty}\int_{-\infty}^{\infty} E_s^2 dxdy \cdot \int_{-\infty}^{\infty}\int_{-\infty}^{\infty} E_2^2 dxdy} \cong$$
$$\frac{w_0^6}{w_1^2 w_2^2}\cos^2\phi\left(\frac{\pi n w_0 \sin\theta}{\lambda}\right)^2 \exp\left[-\left(\frac{\pi n w_0 \sin\theta}{\lambda}\right)^2\right] \quad (16)$$

[Math. 17]
$$T_b = \frac{\left|\int_{-\infty}^{\infty}\int_{-\infty}^{\infty} E_s \cdot E_3^* dxdy\right|^2}{\int_{-\infty}^{\infty}\int_{-\infty}^{\infty} E_s^2 dxdy \cdot \int_{-\infty}^{\infty}\int_{-\infty}^{\infty} E_3^2 dxdy} \cong$$
$$\frac{w_0^6}{w_1^2 w_2^2}\sin^2\phi\left(\frac{\pi n w_0 \sin\theta}{\lambda}\right)^2 \exp\left[-\left(\frac{\pi n w_0 \sin\theta}{\lambda}\right)^2\right] \quad (17)$$

where $T_1$, $T_a$, and $T_b$ represent the efficiency of coupling of the scattered light to the LP01, LP11a, and LP11b modes, and $w_0$ is represented by the following equation:

[Math. 18]
$$w_0^2 = \frac{2w_1^2 w_2^2}{w_1^2 + w_2^2} \quad (18)$$

where the LP11a and LP11b modes couple strongly due to slight stress changes that occur in the tested optical fiber, and therefore, it is difficult to distinguish between the LP11 a and LP11 b modes in reality. Thus, if the LP11a and LP11b modes are assumed as a group of the LP11 mode, the efficiency $T_2$ of coupling of the scattered light to the LP11 mode is represented by the following equation.

[Math. 19]

$$T_2 = T_a + T_b = \frac{w_0^6}{w_1^2 w_2^2}\left(\frac{\pi n w_0 \sin\theta}{\lambda}\right)^2 \exp\left[-\left(\frac{\pi n w_0 \sin\theta}{\lambda}\right)^2\right] \quad (19)$$

The capture rates of the backscattered light are determined by integrating the product of the light intensity scattered at a specific angle and the efficiency of coupling of the scattered light to the propagation mode in the range of 0 to 2n for the solid angle $\Omega$, and are represented by the following equations:

[Math. 20]

$$B_1 = \int_0^{2\pi} \frac{3}{16\pi}(1 + \cos^2\theta) \cdot T_1 d\Omega = \frac{3}{8}\int_0^{\pi/2} \sin\theta \cdot (1 + \cos^2\theta) \cdot T_1 d\theta \quad (20)$$

[Math. 21]

$$B_2 = \int_0^{2\pi} \frac{3}{16\pi}(1 + \cos^2\theta) \cdot T_2 d\Omega = \frac{3}{8}\int_0^{\pi/2} \sin\theta \cdot (1 + \cos^2\theta) \cdot T_2 d\theta \quad (21)$$

where the integrands in equations (20) and (21) are extremely small in a region of $\theta > \pi/2$, and therefore, an upper limit of the integration range may be changed to infinity. At this time, the capture rates $B_1$ and $B_2$ of the backscattered light for the LP01 mode and the LP11 mode are represented by the following equations.

[Math. 22]

$$B_1 = \frac{3}{2}\left(\frac{\lambda}{2\pi n w_1}\right)^2 \quad (22)$$

[Math. 23]

$$B_1 = \frac{3}{2}\frac{w_0^6}{w_1^2 w_2^4}\left(\frac{\lambda}{2\pi n w_0}\right)^2 \quad (23)$$

Thus, according to the equations (7), (22), and (23), the ratio $w_2/w_1$ of the mode field diameter of the LP11 mode to the mode field diameter of the LP01 mode can be determined by the following equation.

[Math. 24]

$$\frac{w_2}{w_1} = \left(2 \cdot 10^{\frac{l_1 - l_2 + K}{20}} - 1\right)^{\frac{1}{2}} \quad (24)$$

Here, the mode field diameter distribution of the LP11 mode can be acquired by substituting, into equation (24), a value of the mode field diameter distribution of the LP01 mode measured in advance, according to a technique in NPL 1, or the like.

The effective cross-sectional area $A_{eff}$ the LP11 mode is represented by the following equation.

[Math. 25]

$$A_{eff} = \frac{\left|\int_{-\infty}^{\infty}\int_{-\infty}^{\infty} E_2^2 dx dy\right|^2}{\int_{-\infty}^{\infty}\int_{-\infty}^{\infty} E_2^4 dx dy} = \frac{4}{3}\pi w_2^2 \quad (25)$$

The effective cross-sectional area $A_{eff}$ of the LP11 mode is represented as a function of the mode field diameter of the LP11 mode, and therefore, it is possible to also acquire the effective cross-sectional area distribution of the LP11 mode from the mode field diameter distribution of the LP11 mode.

REFERENCE SIGNS LIST

10: Tested optical fiber
11: Light source
12: Pulse generator
13: Light intensity modulator
14: Optical circulator
15: Mode multiplexer/demultiplexer
16, 17: Light receiver
18: A/D converter
19: Signal processing unit
20: Relative refractive index difference calculation unit
21: Mode field diameter calculation unit
22: Raman gain efficiency calculation unit
101: Optical pulse testing apparatus
102: Light switch

The invention claimed is:

1. A Raman gain efficiency distribution testing method, comprising using a computing processor to perform: on the basis of information of return light resulting from a test optical pulse being incident on a tested optical fiber and having a wavelength of signal light and a wavelength of excitation light that are shorter than an effective cutoff wavelength of the tested optical fiber,
a relative refractive index difference calculation procedure of acquiring a relative refractive index difference between a core and a clad at an arbitrary position z in a longitudinal direction of the tested optical fiber;
a mode field diameter calculation procedure of acquiring a mode field diameter of a fundamental mode and a mode field diameter of a first high-order mode at the arbitrary position z in the longitudinal direction of the tested optical fiber for each of the wavelength of the signal light and the wavelength of the excitation light;
a Raman gain coefficient computation procedure of computing a Raman gain coefficient of the tested optical fiber from a Raman gain coefficient of a pure quartz core optical fiber at an excitation wavelength of 1 µm, the wavelength of the excitation light, and the relative refractive index difference between the core and the clad at the arbitrary position z acquired in the relative refractive index difference calculation procedure;
an electric field distribution overlap integral computation procedure of computing an electric field distribution overlap integral at the arbitrary position z, between a set of modes and another set of modes, of the mode field diameter of a mode of the set of modes at the wavelength of the signal light and the mode field diameter of a mode of the other set of modes at the wavelength of the excitation light which are acquired in the mode field diameter calculation procedure, the set of modes and the other set of modes each including the fundamental mode and a plurality of the first high-order modes; and a Raman gain efficiency computation procedure of computing a product of the Raman gain coefficient and the electric field distribution overlap integral to acquire a Raman gain efficiency, between a mode of the set of modes and a mode of the other set of modes, of the signal light and the excitation light at the arbitrary position z.

2. The Raman gain efficiency distribution testing method according to claim 1, wherein the tested optical fiber is a quartz optical fiber in which $GeO_2$ is added to a core, and a Raman gain coefficient is computed according to equation C1 in the Raman gain coefficient computation procedure:

[Math. C1]
$$g_g = \frac{g_0(1 + 80\Delta)}{\lambda_P} \quad (C1)$$

where $g_0$ is a Raman gain coefficient of a pure quartz core optical fiber at an excitation wavelength of 1 μm, $\Delta$ is a relative refractive index difference between a core and a clad, and $\lambda_p$ is a wavelength of excitation light.

3. The Raman gain efficiency distribution testing method according to claim 1, wherein in the electric field distribution overlap integral computation procedure, the electric field distribution overlap integrals are computed according to equation C2 to equation C6:

[Math. C2]
$$F_{11} = \frac{2}{\pi\left[w_1^2(\lambda_S) + w_1^2(\lambda_P)\right]} \quad (C2)$$

[Math. C3]
$$F_{12} = F_{13} = \frac{2w_1^2(\lambda_S)}{\pi\left[w_1^2(\lambda_S) + w_2^2(\lambda_P)\right]^2} \quad (C3)$$

[Math. C4]
$$F_{21} = F_{31} = \frac{2w_2^2(\lambda_S)}{\pi\left[w_2^2(\lambda_S) + w_1^2(\lambda_P)\right]^2} \quad (C4)$$

[Math. C5]
$$F_{22} = F_{33} = \frac{6w_2^2(\lambda_S)w_2^2(\lambda_P)}{\pi\left[w_2^2(\lambda_S) + w_2^2(\lambda_P)\right]^2} \quad (C5)$$

[Math. C6]
$$F_{23} = F_{32} = \frac{2w_2^2(\lambda_S)w_2^2(\lambda_P)}{\pi\left[w_2^2(\lambda_S) + w_2^2(\lambda_P)\right]^2} \quad (C6)$$

where, $w_1(\lambda_s)$ is a mode field diameter of a fundamental mode (LP01) of the signal light, $w_1(\lambda_p)$ is a mode field diameter of the fundamental mode (LP01) of the excitation light, $w_2(\lambda_s)$ is a mode field diameter of a first high-order mode (LP11a or LP11b) of the signal light, $w_2(\lambda_p)$ is a mode field diameter of the first high-order mode (LP11a or LP11b) of the excitation light, $F_{ij}$ is an electric field distribution overlap integral between modes i and j, i=1 represents the fundamental mode (LP01) of the signal light, i=2 represents the first high-order mode (LP11a) of the signal light, i=3 represents the first high-order mode (LP11b) of the signal light, j=1 represents the fundamental mode (LP01) of the excitation light, j=2 represents the first high-order mode (LP11a) of the excitation light, and j=3 represents the first high-order mode (LP11b) of the excitation light.

4. A Raman gain efficiency distribution testing apparatus, comprising:

a test light injector configured to emit a test optical pulse having a wavelength of signal light and a wavelength of excitation light that are shorter than an effective cutoff wavelength of a tested optical fiber, to the tested optical fiber;

a return light receiver configured to receive return light being separated into modes, being generated in the tested optical fiber, and resulting from the test optical pulse; and a computing processor configured to:

acquire a relative refractive index difference between a core and a clad at an arbitrary position z in a longitudinal direction of the tested optical fiber;

acquire a mode field diameter of a fundamental mode and a mode field diameter of a first high-order mode at the arbitrary position z in the longitudinal direction of the tested optical fiber for each of the wavelength of the signal light and the wavelength of the excitation light;

compute a Raman gain coefficient of the tested optical fiber from a Raman gain coefficient of a pure quartz core optical fiber at an excitation wavelength of 1 μm, the wavelength of the excitation light, and the relative refractive index difference between the core and the clad at the arbitrary position z;

compute an electric field distribution overlap integral at the arbitrary position z, between a set of modes and another set of modes, of the mode field diameter of a mode of the set of modes at the wavelength of the signal light, and the mode field diameter of a mode of the other set of modes at the wavelength of the excitation light, the set of modes and the other set of modes each including the fundamental mode and a plurality of the first high-order modes; and compute a product of the Raman gain coefficient and the electric field distribution overlap integral to acquire a Raman gain efficiency, between a mode of the set of modes and a mode of the other set of modes, of the signal light and the excitation light at the arbitrary position z, based on the return light received by the light receiver.

5. The Raman gain efficiency distribution testing apparatus according to claim 4, wherein the tested optical fiber is a quartz optical fiber in which $GeO_2$ is added to a core, and the computing processor computes the Raman gain coefficient according to equation C1 as follows:

$$g_R = \frac{g_0(1 + 80\Delta)}{\lambda_p} \quad (C1)$$

where $g_0$ is a Raman gain coefficient of a pure quartz core optical fiber at an excitation wavelength of 1 μm, $\Delta$ is a relative refractive index difference between a core and a clad, and $\lambda_p$ is a wavelength of excitation light.

6. The Raman gain efficiency distribution testing apparatus according to claim 4, wherein the computing processor computes the electric field distribution overlap integrals according to equation C2 to equation C6 as follows:

$$F_{11} = \frac{2}{\pi[w_1^2(\lambda_S) + w_1^2(\lambda_p)]} \tag{C2}$$

$$F_{12} = F_{13} = \frac{2w_1^2(\lambda_S)}{\pi[w_1^2(\lambda_S) + w_2^2(\lambda_p)]^2} \tag{C3}$$

$$F_{21} = F_{31} = \frac{2w_2^2(\lambda_S)}{\pi[w_2^2(\lambda_S) + w_1^2(\lambda_p)]^2} \tag{C4}$$

$$F_{22} = F_{33} = \frac{6w_2^2(\lambda_S) + w_2^2(\lambda_p)}{\pi[w_2^2(\lambda_S) + w_2^2(\lambda_p)]^3} \tag{C5}$$

$$F_{23} = F_{32} = \frac{2w_2^2(\lambda_S) + w_2^2(\lambda_p)}{\pi[w_2^2(\lambda_S) + w_2^2(\lambda_p)]^3} \tag{C6}$$

where, $w_1(\lambda_s)$ is a mode field diameter of a fundamental mode (LP01) of the signal light, $w_1(\Lambda_p)$ is a mode field diameter of the fundamental mode (LP01) of the excitation light, $w_2(\lambda_s)$ is a mode field diameter of a first high-order mode (LP11a or LP11b) of the signal light, $w_2(\lambda_p)$ is a mode field diameter of the first high-order mode (LP11a or LP11b) of the excitation light, $F_{ij}$ is an electric field distribution overlap integral between modes i and j, i=1 represents the fundamental mode (LP01) of the signal light, i=2 represents the first high-order mode (LP11a) of the signal light, i=3 represents the first high-order mode (LP11b) of the signal light, j=1 represents the fundamental mode (LP01) of the excitation light, j=2 represents the first high-order mode (LP11a) of the excitation light, and j=3 represents the first high-order mode (LP11b) of the excitation light.

\* \* \* \* \*